US009800178B2

(12) United States Patent
Zhang et al.

(10) Patent No.: US 9,800,178 B2
(45) Date of Patent: Oct. 24, 2017

(54) FOLDABLE MINIATURE VIBRATION GENERATOR AND MANUFACTURING METHOD THEREOF

(71) Applicant: PEKING UNIVERSITY, Beijing (CN)

(72) Inventors: Haixia Zhang, Beijing (CN); Bo Meng, Beijing (CN); Wei Tang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 356 days.

(21) Appl. No.: 14/761,877

(22) PCT Filed: Feb. 5, 2013

(86) PCT No.: PCT/CN2013/071363
§ 371 (c)(1),
(2) Date: Jul. 17, 2015

(87) PCT Pub. No.: WO2014/110848
PCT Pub. Date: Jul. 24, 2014

(65) Prior Publication Data
US 2015/0357942 A1  Dec. 10, 2015

(30) Foreign Application Priority Data

Jan. 21, 2013 (CN) .......................... 2013 1 0021766

(51) Int. Cl.
*H02N 1/04* (2006.01)
*H02N 1/00* (2006.01)

(52) U.S. Cl.
CPC .............. *H02N 1/04* (2013.01); *H02N 1/002* (2013.01); *Y10T 29/49004* (2015.01)

(58) Field of Classification Search
CPC . H01L 41/0471; H01L 41/27; H01L 41/0805; H01L 41/09; H01L 41/297; H02N 11/002
(Continued)

(56) References Cited

U.S. PATENT DOCUMENTS 7,294,953 B2* 11/2007 Iwase .................. H01L 41/0472
                                                        310/366
7,548,015 B2*  6/2009 Benslimane ............ B81B 3/007
                                                        310/363
(Continued)

FOREIGN PATENT DOCUMENTS

CN        102646788      8/2012
CN        102684546      9/2012
(Continued)

OTHER PUBLICATIONS

International Search Report issued in the corresponding International Application No. PCT/CN2013/071363, dated Oct. 31, 2013, 2 pages.
(Continued)

*Primary Examiner* — Terrance Kenerly
(74) *Attorney, Agent, or Firm* — Hamre, Schumann, Mueller & Larson, P.C.

(57) ABSTRACT

The present invention discloses a folding vibration microgenerator and a method of manufacturing the same. The microgenerator comprises a foldable sandwiched substrate, wherein the foldable substrate comprising two flexible insulating substrates and an induction electrode located between the two flexible insulating substrates, in which the induction electrode is constructed by two complementary comb-shaped electrodes. The foldable substrate has upper and lower surfaces, on which the first friction structure units and the second friction structure units are respectively periodically distributed, and the first friction structure units corresponds to the odd-numbered comb teeth of the induction electrode and the second friction structure units corresponds to the even-numbered comb teeth of the induction electrode. The foldable substrate is folding at gaps between two adjacent comb teeth of the induction electrode as a serrate shape, thereby forming a folding vibration microgenerator.

(Continued)

The microgenerator is easy to be produced and largely increases output power per unit area. Due to inflexibility of the folding structure itself, the energy conversion efficiency of the microgenerator is effectively increased while output power being maintained.

17 Claims, 3 Drawing Sheets

(58) Field of Classification Search
USPC .................................................. 310/300, 310
See application file for complete search history.

(56) References Cited

U.S. PATENT DOCUMENTS

| | | | |
|---|---|---|---|
| 2007/0213579 A1* | 9/2007 | Hegde | A61M 1/1053 600/17 |
| 2009/0239039 A1* | 9/2009 | Benslimane | B81B 3/007 428/161 |
| 2010/0253184 A1 | 10/2010 | Choi et al. | |
| 2015/0318800 A1* | 11/2015 | Zhang | H02N 1/04 310/310 |

FOREIGN PATENT DOCUMENTS

| | | |
|---|---|---|
| CN | 102710166 | 10/2012 |
| DE | 102010016499 | 10/2011 |
| JP | 04261374 | 9/1992 |

OTHER PUBLICATIONS

Wang et al., "Nanoscale triboelectric-effect-enabled energy conversion for sustainably powering portable electronics", Nano Letters, vol. 12, pp. 6339-6346, 2012.

* cited by examiner

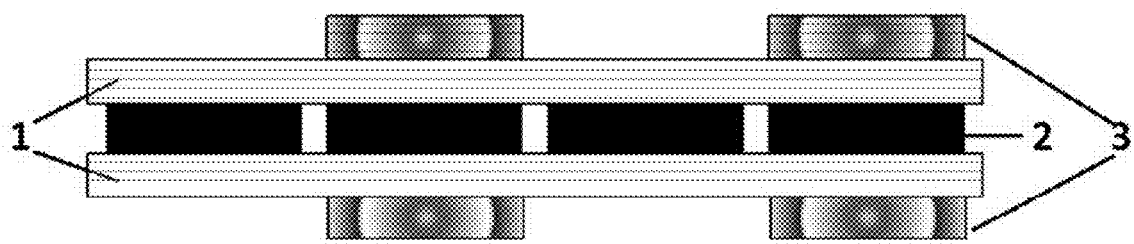
Figure 1 (a)
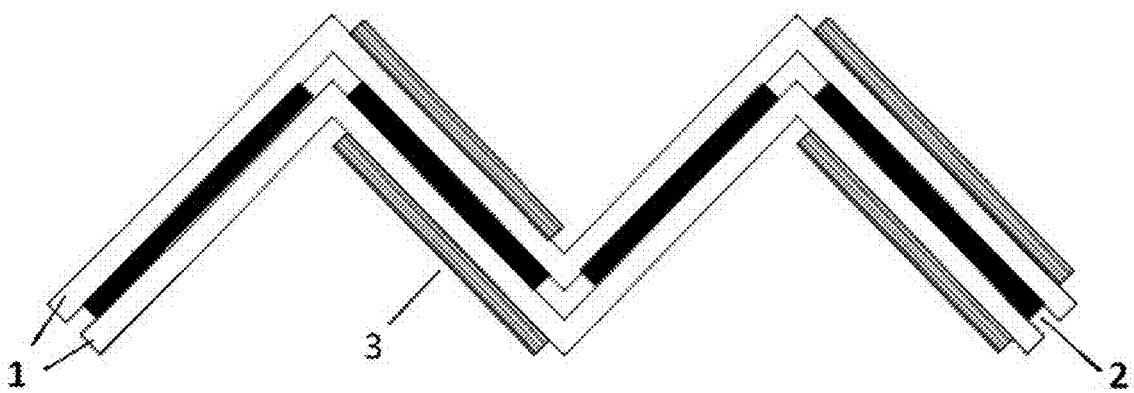
Figure 1 (b)
Figure 1
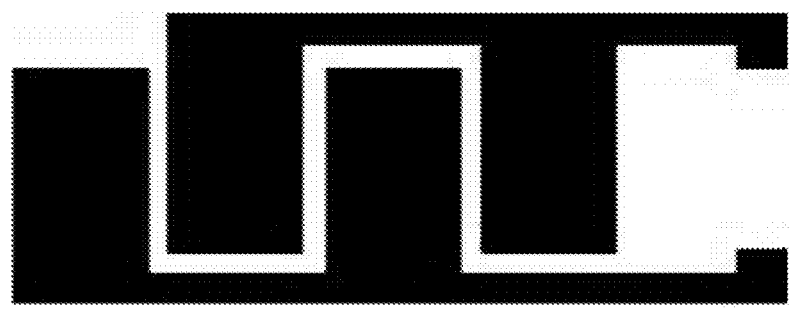
Figure 2

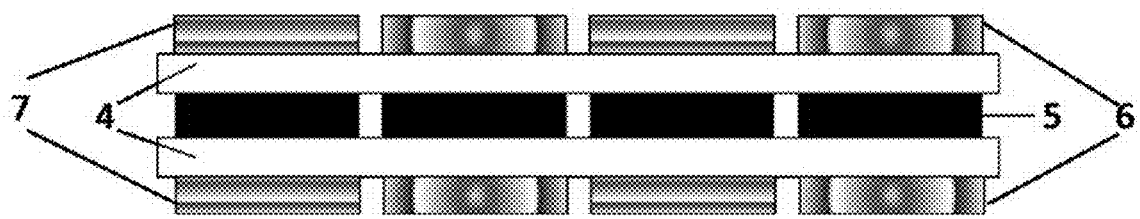
Figure 5 (a)
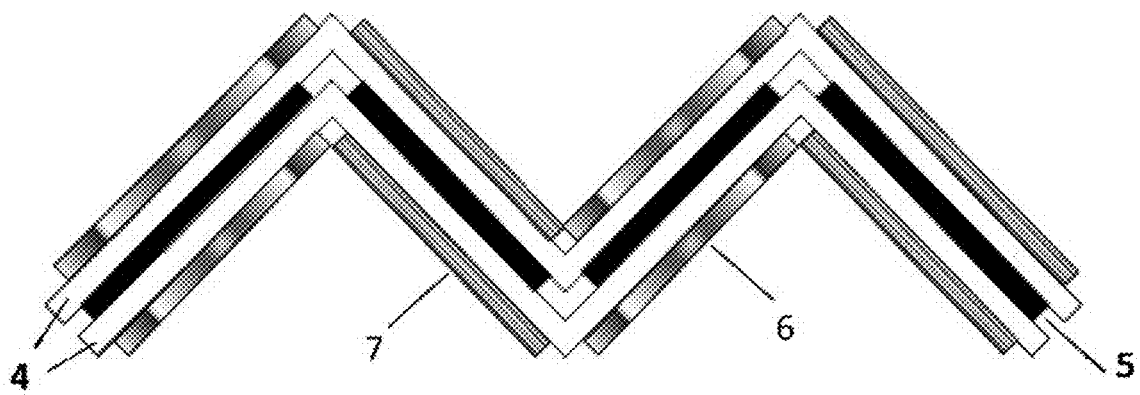
Figure 5 (b)
Figure 5
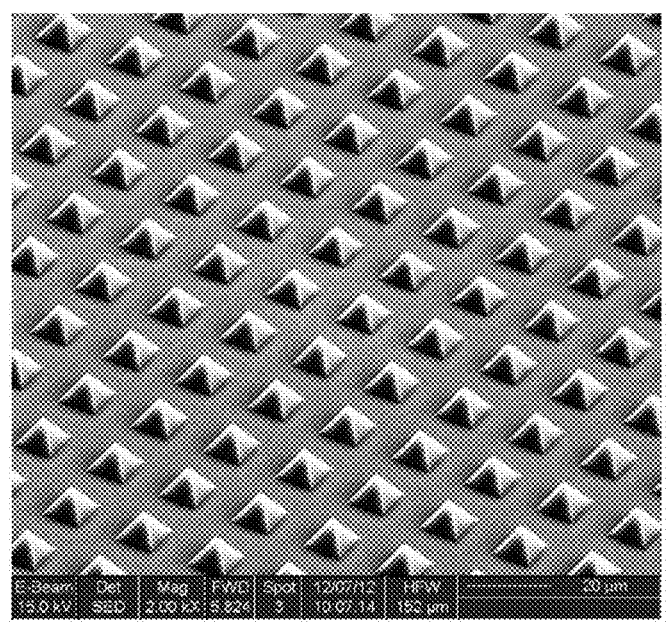
Figure 6

FOLDABLE MINIATURE VIBRATION GENERATOR AND MANUFACTURING METHOD THEREOF

BACKGROUND

Technical Field

The present invention relates to a folding vibration microgenerator and a method of manufacturing the same, and particular, to a folding vibration microgenerator that is manufactured based on a flexible substrate and operates on basis of a triboelectric induction effect.

Description of the Related Art

As global energy crisis is developing and contradiction between energy supply and demand is worsening, researchers have tried to find an effective way of capturing energy in living environment to achieve sustainable development of energy source, and thus, particularly, to apply in fields of consumption electronics, implantable medical devices, internet of thing (JOT), etc. It is a research hotspot to produce a microgenerator by micro/nanoscale fabrication technology. Various types of microgenerators have been produced based on piezoelectric, electromagnetic, thermoelectric effects through various fabrication techniques and some of them have been implemented. However, these microgenerators are limited by their lower output power density and energy conversion efficiency and thus are hard to meet practical application demands.

It is known that, due to the triboelectric induction effect, rubbing or impacting two different surfaces with each other can generate electrostatic charge accumulation while force them reciprocating in the direction perpendicular to the two surfaces, i.e., closing and separating them, can generate charge transportation between the induction electrodes corresponding to the two surfaces, thereby effectively collecting mechanical energy from ambience and achieving a folding vibration microgenerator with a high output power density and a high energy conversion efficiency.

It has been obtained a single triboelectric-induction-based arch-shaped triboelectric nano-generator (WANG, S., Lin, L. and WANG, Z. L. Nanoscale triboelectric-effect-enabled energy conversion for sustainably powering portable electronics, Nano Letters 12, 6339-6346 (2012)) by a relative complex micro/nanoscale fabrication process, which may output a relative high instantaneous output voltage. However, during fabricating this type generator, an arch-shaped structure needs to be prepared through a multilayer laminated film, which renders a complicated production process and a high cost, and thus is hard to be produced and assembled in batch.

SUMMARY OF THE DISCLOSURE

Aiming to problems in prior arts, it is an objective to provide a folding vibration microgenerator and a method of manufacturing the same, in which a folding structure is used, including a foldable unit consisted of two surfaces friction layers and an induction electrode therebetween, thereby largely increasing output power per unit area, and due to flexibility of the folding structure, effectively avoiding energy consumption in elastic potential energy by transforming to an arch-shaped structure while ensuring output power level and effectively improving energy conversion efficiency. The manufacturing method according to the present invention is simple in process, short in production cycle, low in cost, high in yield, and may achieve batch production. Further, a single folded vibration microgenerator produced according to the method does not need to be further assembled manually or mechanically, which renders that products have uniform properties and thus effective decreases, even eliminates, loss during connecting and assembling a plurality of vibration microgenerators. The method is compatible with a process of manufacturing a printed circuit board and thus may achieve interconnection of a plurality of folding vibration microgenerators in parallel or in series to assemble a microgenerator set, and connection to an external load circuit.

In order to achieve the above objective, there is provided a folding vibration microgenerator, comprising a foldable sandwiched substrate composed of two flexible insulating substrates and an induction electrode therebetween, first friction structure units and second friction structure units. The sandwiched substrate comprises upper and lower surfaces, on which the first friction structure units and the second friction structure units are periodically distributed and the upper and lower surfaces are symmetrical in structure with respect to each other. Two complementary comb-teeth shaped induction electrodes correspond to the first and second friction structure units. The sandwiched substrate is folded into a serrate shape at gaps between two adjacent comb teeth, thereby forming a folding vibration microgenerator, whose number of folded steps is determined by the number of comb teeth of the induction electrode, which is not less than 2.

The flexible insulating substrates in the above mentioned embodiment may be made of a high polymer material, such as polyethylene terephthalate (PET), polyimide (PI), etc., and may have a thickness of 20 $\mu m$~60 $\mu m$.

In the mentioned embodiment, the induction electrode may be made of a good electrical conductive metal material, such as copper, aluminium, etc. and may have a thickness of 8 $\mu m$~20 $\mu m$. The induction electrodes may be configured as two complementary comb-teeth shaped structures that correspond to the first and second friction structure units.

In the above embodiment, the surface with the first friction structure units thereon has micro/nano-array structures, which are made of a material that is prone to lose electrons and accumulate positive charges as a close contact occurs, such as copper, silver, gold, aluminium, PET, etc.

In the above embodiment, the surface with the second friction structure units thereon is a smooth surface or a surface with micro/nano-array structures, which are made of a material that is prone to obtain electrons and accumulate negative charges as a close contact occurs, such as polydimethylsiloxane (PDMS), polyvinylchloride (PVC), etc.

There is further provided a method of manufacturing a folding vibration microgenerator according to the present invention, comprising:

a. depositing or bonding a metal film on a flexible insulating substrate as an electrode layer;

b. forming an induction electrode in the electrode layer by photoetching and chemical etching or physical etching processes, in which the induction electrode is constructed by two complementary comb-teeth shaped structures and the number of folded steps of the generator is determined by the number of the comb teeth; the total number of the comb teeth is not less than 2;

c. bonding an another flexible insulating substrate on the induction electrode, thereby forming a foldable sandwiched substrate;

d. fabricating first friction structure units on upper and lower surfaces of the sandwiched substrate;

e. fabricating second friction structure units on upper and lower surfaces of the sandwiched substrate;

f. modifying the friction structure units by physical chemistry processes, such as electroplating process, passivating process, etc.;

g. mechanically folding the sandwiched substrate at gaps between two adjacent comb teeth of the induction electrode into a serrate shape, thereby obtaining a folding vibration microgenerator.

In the above method of manufacturing the above folding vibration microgenerator:

In step a, the flexible insulating substrate is made of a flexible high polymer material, such as polyethylene terephthalate (PET), polyimide (PI), etc.

In step a, the induction electrode may be made of a good electrical conductive metal material, such as copper, aluminium, etc.

In step d, the surface with the first friction structure units thereon has micro/nano-array structures, which are made of a material that is prone to lose electrons and accumulate positive charges as a close contact occurs, such as copper, silver, gold, aluminium, PET, etc.

In step e, the surface with the second friction structure units thereon is a smooth surface or a surface with micro/nano-array structures, which are made of a material that is prone to obtain electrons and accumulate negative charges as a close contact occurs, such as PI, polydimethylsiloxane (PDMS), polyvinylchloride (PVC), etc.

It is appreciated that the above mentioned steps may not necessarily be performed in a constant order, but may be performed in a modified sequence or may be pruned as required.

Compared with the prior arts, the folding vibration microgenerator according to the present invention has the following advantages:

1. In the folding structure according to the present invention, two surface friction structure units and the induction electrode therebetween form a folding unit, which largely improves output power per unit area and effectively decrease energy consumption in elastic potential energy by transforming to an arch-shaped structure while ensuring output power, thereby effectively improving energy conversion efficiency.

2. The manufacturing method according to the present invention is simple in process, short in production cycle, low in cost, and high in yield. Further, a single folding vibration microgenerator produced according to the method does not need to be further assembled manually or mechanically, which renders products have uniform properties and effectively decreases, even eliminates, loss during connecting and assembling a plurality of vibration microgenerators.

3. The method according to the present invention is compatible with a process of manufacturing a printed circuit board and thus may achieve interconnection of a plurality of folding vibration microgenerators in parallel or in series to assemble a microgenerator set, and connection to an external load circuit.

BRIEF DESCRIPTION OF THE DRAWINGS

FIG. 1 is a schematic structural view of a folding vibration microgenerator according to the present disclosure, in which FIG. 1(a) is a schematic plan structural view and FIG. 1(b) is a schematic folded view;

FIG. 2 is a schematic structural view of a comb-shaped complementary induction electrode according to the present disclosure;

FIG. 5 is a schematic structural view of another folding vibration generator according to the present disclosure, in which FIG. 5(a) is a schematic plan structural view and FIG. 5(b) is a schematic folded view; and FIG. 6 is a scanning electron microscope image of a pyramid-shaped PDMS array according to the present disclosure;

LIST OF REFERENCE NUMBERS

1—PI substrate, 2—copper induction electrode, 3—copper micron-scale array, 4—PET substrate, 5—aluminium induction electrode, 6—aluminium friction unit, 7—pyramid-shaped PDMS array unit.

DETAILED DESCRIPTION OF THE EMBODIMENTS

The embodiments of the present disclosure will be described further in detailed with reference to the accompanying drawings.

Embodiment 1

According to this embodiment of the present disclosure, there is provided a method of manufacturing a folding vibration microgenerator as shown in FIG. 1. The manufactured generator structurally includes a PI substrate 1, a copper induction electrode 2 and micron-scale copper array units 3.

In the embodiment, the substrate is a flexible copper clad plate, in which the first friction structure units are made of copper and the second friction structural units are made of PI. The method may be modified as required.

Figure 3:
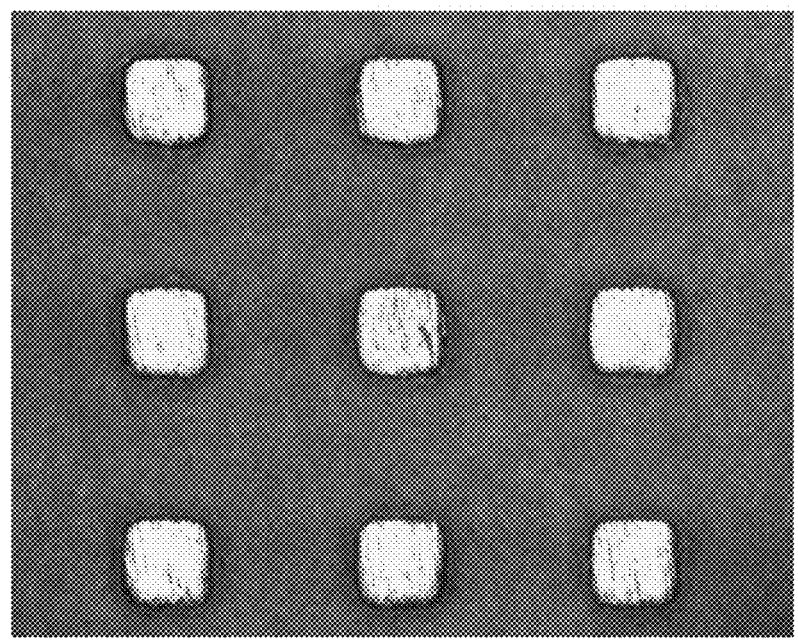
FIG. 3 is a micrograph of a copper micron-scale array according to the present disclosure.
Figure 4:
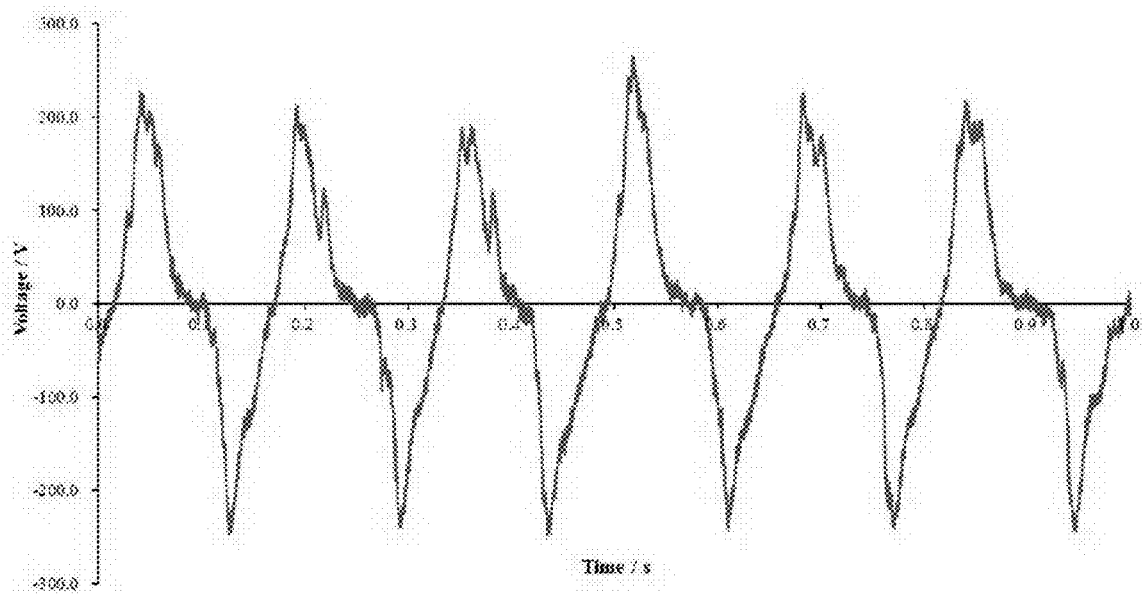
FIG. 4 is a schematic view of an output voltage measurement of a folding vibration microgenerator produced by the method according to the first embodiment.

The detailed manufacturing method includes steps of:

a. forming an induction electrode 2 that is constructed by two complementary comb-shaped electrodes, as shown in FIG. 2, on a copper layer of an upper surface of a flexible double-sided copper clad plate substrate through photoetching and chemical etching, in which the flexible double-sided copper clad plate substrate is the PI substrate 1;

b. forming, through photoetching and chemical etching, periodically distributed rectangle micro-scale copper array units 3 in a copper layer of a lower surface of the flexible double-sided copper clad plate and in a copper layer of a single-sided flexible copper clad plate, as first friction structure units, respectively, the micro-scale copper array having a critical size in a range from 25 μm to 150 μm and a spacing in a range from 25 μm to 150 μm, as shown in a micrograph in FIG. 3;

c. bonding the flexible double-sided copper clad plate with the single-sided flexible copper clad plate via the induction electrode 2 and the PI substrate 1, such that the micron-scale copper array units of two side surfaces of the bonded structure are symmetrical with respect to each other;

d. using the uncovered surface of the PI substrate 1 as the second friction structure unit;

e. folding the bonded structure into a serrate shape, thereby producing a folding vibration microgenerator.

wherein, in the above steps, the chemical etching is proceeded by using a corrosive solution of iron trichloride ($FeCl_3$); the flexible double-sided copper clad plate in steps a, b and c is a three-layers laminate film plate including a copper layer, a PI layer and a copper layer, in which the PI layer has a thickness of 20 μm-60 μm and the copper layer has a thickness of 12 μm-25 μm; and, the single-sided flexible copper clad plate in steps b and c is a double-layer laminate film plate including a PI layer and a copper layer, in which the PI layer has a thickness of 20 μm-60 μm and the copper layer has a thickness of 12 μm-25 μm.

The folding vibration microgenerator manufactured by the method according to the above embodiment presents an output voltage measurement as shown in FIG. 5.

Embodiment 2

According to this embodiment, there is provided a method of manufacturing a folding vibration micro generator, as shown in FIG. 5.

The folding vibration microgenerator includes a PET substrate 4, an aluminium induction electrode 5, aluminium friction units 6 and pyramid-shaped PDMS array units 7.

The method includes the steps of:

a. depositing an aluminium film on the PET substrate 4 through evaporation, as an electrode layer, in which the PET substrate 4 has a thickness of 30 μm-60 μm and the aluminium film has a thickness in a range from 1 μm to 10 μm;

b. forming an aluminium induction electrode 5 that composes of two complementary comb-shaped structures in the electrode layer through photoetching and chemical etching;

c. bonding an another PET substrate 4 on the induction electrode, thereby two PET substrates 4 and the induction electrode 5 forming a folding sandwiched substrate;

d. depositing aluminium films on upper and lower surfaces of the sandwiched substrate through evaporation, and forming periodically distributed aluminium friction units 6 by photoetching and chemical etching the aluminium films, which are located at positions corresponding to odd-numbered comb teeth of the induction electrode shown in FIG. 2, wherein the aluminium friction units 6 are used as a first friction structure units;

e. forming a periodically distributed pyramid-shaped PDMS array 7 by a casting film transfer process at locations corresponding to the even-number comb teeth of the induction electrode shown in FIG. 2 in the upper and lower surfaces of the sandwiched substrate, the periodically distributed pyramid-shaped PDMS array 7 being used as the second friction structure units, the pyramid-shaped PDMS array has a critical size of 2 μm-50 μm and a spacing of 2 μm-50 μm, as shown in a scanning electron microscope image in FIG. 6;

f. folding the obtained structure into a serrate shape, thereby producing a folding vibration microgenerator.

wherein, in the above steps, the chemical etching in steps b and d is proceeded by using a corrosive solution of phosphoric acid.

A folding vibration microgenerator and a method of manufacturing the same according to the present disclosure have been described together with the working principle and embodiments thereof, so as to aid those skilled in the art to understand the key principle and the method of the present disclosure. It would be appreciated by those skilled in the art that the above embodiments are intended to be illustrative for purpose of description, but not limitative. Changes and equivalents, which are made without departing from teaching of the present application and the scopes of claims, should be include within the scopes of claims of the present application.

The invention claimed is:

1. A folding vibration microgenerator, characterized by comprising a foldable substrate, the foldable substrate comprising two flexible insulating substrates and an induction electrode located between the two flexible insulating substrates, and the induction electrode being constructed by two complementary comb-shaped electrodes, wherein first friction structure units and second friction structure units are respectively periodically distributed on upper and lower surfaces of the foldable substrate such that the first friction structure units correspond to the odd-numbered/even-numbered comb teeth of the induction electrode and the second friction structure units correspond to the even-numbered/odd-numbered comb teeth of the induction electrode, and the foldable substrate is folding at gaps between two adjacent comb teeth of the induction electrode into a serrate shape, thereby forming a folding vibration microgenerator.

2. The folding vibration microgenerator according to claim 1, characterized in that, the two complementary comb-shaped electrodes have the same comb teeth in width.

3. The folding vibration microgenerator according to claim 1, characterized in that, the flexible insulating substrate is made of a flexible high polymer material.

4. The folding vibration microgenerator according to claim 2, characterized in that, the surface with the first friction structure units thereon has micro/nanoscale array structures therein, which are made by a material that is prone to lose electrons and accumulate positive charges as a close contact occurs; and, the surface with the second friction structure units thereon is a smooth surface or a surface with micro/nanoscale array structures therein, which are made of a material that is prone to obtain electrons and accumulate negative charges as a close contact occurs.

5. The folding vibration microgenerator according to claim 2, characterized in that, the surface with the second friction structure units thereon has micro/nanoscale array structures therein, which are made of a material that is prone to lose electrons and accumulate positive charges as a close contact occurs; and, the surface with the first friction structure units thereon is a smooth surface or a surface with micro/nanoscale array structures therein, which are made of a material that is prone to obtain electrons and accumulate negative charges as a close contact occurs.

6. The folding vibration microgenerator according to claim 4, characterized in that, the first and second friction structure units are those modified through an electroplating process or a passivating process.

7. A method of manufacturing a folding vibration microgenerator, comprising:

1) preparing a foldable substrate comprising two flexible insulating substrates and an induction electrode located between the two flexible insulating substrates, the induction electrode being constructed by two complementary comb-shaped electrodes;

2) forming first friction structure units respectively on upper and lower surface of the foldable substrate, wherein the first friction structure units correspond to the odd-numbered comb teeth of the induction electrode;

3) forming second friction structure units respectively on upper and lower surface of the foldable substrate, wherein the second friction structure units correspond to the even-numbered comb teeth of the induction electrode; and 4) folding the foldable substrate at gaps between two adjacent comb teeth of the induction electrode into a serrate shape, thereby forming a folding vibration microgenerator.

8. A method of manufacturing a folding vibration microgenerator, comprising:
1) forming an induction electrode on an upper surface of a flexible double-sided insulating substrate coated with metal layers on its upper and lower surfaces, the induction electrode being constructed by two complementary comb-shaped electrodes;
2) forming first friction structure units and second friction structure units periodically distributed in the metal layer on the lower surface of the flexible double-sided insulating substrate and in a metal layer of a flexible single-sided insulating substrate coated with the metal layer, respectively;
3) bonding the surface of the flexible double-sided insulating substrate having the induction electrode with the surface of the flexible single-sided insulating substrate opposite to the first and second friction structure units to obtain a substrate structure;
4) folding the substrate structure at gaps between two adjacent comb teeth of the induction electrodes into a serrate shape, thereby forming a folding vibration microgenerator;
wherein the first friction structure units correspond to the odd-numbered comb teeth of the induction electrode and the second friction structure units correspond to the even-numbered comb teeth of the induction electrode.

9. The method according to claim 8, characterized in that,
the two complementary comb-shaped electrodes have the same comb teeth in width.

10. The method according to claim 9, characterized in that,
the surface with the first friction structure units thereon has micro/nanoscale array structures therein, which are made of a material that is prone to lose electrons and accumulate positive charges as a close contact occurs; and, the surface with the second friction structure units thereon is a smooth surface or a surface with micro/nanoscale array structures therein, which are made of a material that is prone to obtain electrons and accumulate negative charges as a close contact occurs.

11. The method according to claim 9, characterized in that,
the surface with the second friction structure units thereon has micro/nanoscale array structures therein, which are made of a material that is prone to lose electrons and accumulate positive charges as a close contact occurs; and, the surface with the first friction structure units thereon is a smooth surface or a surface with micro/nanoscale array structures therein, which are made of a material that is prone to obtain electrons and accumulate negative charges as a close contact occurs.

12. The method according to claim 8, characterized in that,
the first and second friction structure units are those modified through an electroplating process or a passivating process.

13. The method according to claim 7, characterized in that,
the two complementary comb-shaped electrodes have the same comb teeth in width.

14. The method according to claim 8, characterized in that,
the two complementary comb-shaped electrodes have the same comb teeth in width.

15. The method according to claim 9, characterized in that,
the surface with the first friction structure units thereon has micro/nanoscale array structures therein, which are made of a material that is prone to lose electrons and accumulate positive charges as a close contact occurs; and, the surface with the second friction structure units thereon is a smooth surface or a surface with micro/nanoscale array structures therein, which are made of a material that is prone to obtain electrons and accumulate negative charges as a close contact occurs.

16. The method according to claim 9, characterized in that,
the surface with the second friction structure units thereon has micro/nanoscale array structures therein, which are made of a material that is prone to lose electrons and accumulate positive charges as a close contact occurs; and, the surface with the first friction structure units thereon is a smooth surface or a surface with micro/nanoscale array structures therein, which are made of a material that is prone to obtain electrons and accumulate negative charges as a close contact occurs.

17. The method according to claim 8, characterized in that,
the first and second friction structure units are those modified through an electroplating process or a passivating process.

* * * * *